Figure 1:
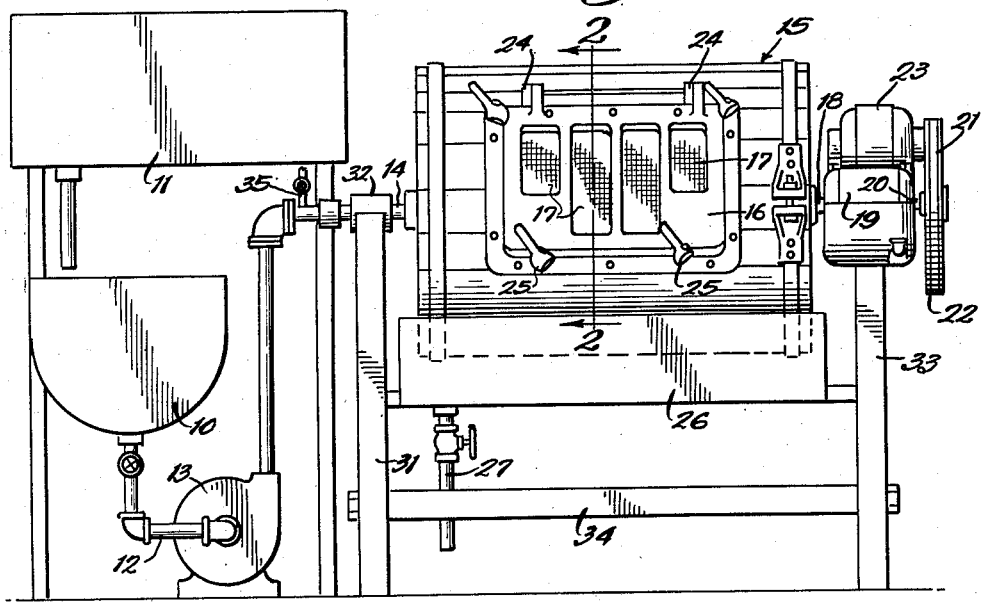

Feb. 19, 1957 D. M. GREER ET AL 2,782,122

CHEESE MANUFACTURE

Filed May 19, 1951

INVENTORS:
Donald M. Greer
and John L. Zink,
BY Carl C. Batz
ATTORNEY.

United States Patent Office 2,782,122
Patented Feb. 19, 1957

2,782,122
CHEESE MANUFACTURE

Donald M. Greer, Hinsdale, and John L. Zink, Chicago, Ill., assignors to Armour and Company, Chicago, Ill., a corporation of Illinois Application May 19, 1951, Serial No. 227,174

1 Claim. (Cl. 99—116)

This invention relates to cheese manufacture. The invention embraces novel methods of cheese manufacture, and more particularly the method in which curd and whey are pumped together from a forming vat to a draining zone, etc.

This application constitutes a continuation-in-part of our copending application, Serial No. 213,722, filed March 3, 1951, for Cheese Manufacture, and being a continuation-in-part of our copending application, Serial No. 790,628, filed December 9, 1947, for Cheese Manufacture; and now Patent 2,544,672, issued March 13, 1951.

In the manufacture of cheese, it is customary to treat the milk in vats to form a curd, to withdraw the whey to a substantial extent, and then to treat the curd as a mass in several steps involving hand operations. In such hand operations, the curd body is cut into pieces and the pieces piled or cheddared. Finally, the curd is milled, salted and hooped.

The above hand operations involved sanitation hazards, are expensive, and require considerable time and labor.

After the curd formation in the vat, and after a substantial amount of the whey has been drained off, it is found when the remaining curd is transferred to a cheese-forming zone by shoveling or by other means, the curd particles are broken into smaller size and fat is spilled out of the curd and lost. Similarly, other ingredients which are desired for the cheese body are lost in the further draining of the whey. Apparently the whey exerts a protective influence upon the curd in preserving the proper particle size and the removal of the whey, or the bulk of it, leaves the curd unprotected during the subsequent transferring steps. Even though the whey and curd be drained together from one level to another and there subjected to a draining separation, the material tends to stratify and the curd tends to pack, making it difficult to filter the whey so as to preserve in the curd the desired fat and other important constituents for the cheese.

Those skilled in the art of cheese manufacture have long been familar with the delicate character of the curd particles and for this reason have been afraid of any treatment of the curd and whey which would tend to affect such particles. While pumps have been employed for decades in cheese-making plants for transferring milk from one place to another, no one has dared to use pumps in connection with whey and curd. We believe that the fear that is felt for such a practice is based upon the knowledge that such curd particles are of a fragile character and therefore pumping should be avoided at all costs.

We have discovered that pumping of the curd and whey is not only feasible but that from such pumping their occurs a new result which is highly beneficial in the cheese-making process. By pumping the curd and whey from the forming vat, we find that there is sufficient general agitation to distribute the curd particles throughout the whey in a substantially uniform manner so that the whey particles are surrounded by liquid whey and thus protected against breaking up or disintegrating during the transfer from the curd vat to the draining vessel or treating zone. By employing a pump having a substantial clearance therein, the whey and curd are passed without breaking up of the curd particles or without a reduction in particle size and without a spillage of fat from the particles. Further, when the curd and whey are forced upwardly against the head of liquid consisting of curd and whey, the uniformity of the mixture of the particles in the whey is enhanced. Finally, when the material reaches the drainage vessel, the curd particles which remain unbroken deposit upon the vessel wall to form a filter bed of relatively uniform character so that the whey can drain therefrom from perforations in the vessel wall. Such a bed not only enables the whey to be removed effectively but retains the fat, minerals and other desired constituents for the cheese, and during subsequent kneading or working operations in which the whey is further removed from the curd, such materials are thoroughly incorporated into the body which now becomes cheese.

An object of the invention is to provide a process for the treatment of whey and curd as above described. A further object is to provide a process in which curd and whey are pumped from the curd-forming vat without breaking up the curd particles and forming in the draining vessel a uniform bed of particles for the drainage of whey therethrough. A still further object is to provide in a cheese-making process a method of transferring the whey and curd by pumping from the vat to the draining vessel while protecting the curd particles by distributing them uniformly through the whey body. Yet another object is to provide a process for the manufacture of whey in which hand operations are eliminated and in which more effective control is maintained over the various factors involved in cheese-making. A still further object is to provide a new method and means of cheese manufacture in which a large volume of cheese can be produced from whey and curd without requiring any handling of the product manually, while producing better quality cheese within a briefer period. Other specific objects and advantages will appear as the specification proceeds.

The invention herein may be practiced in connection with apparatus illustrated in the accompanying drawing, in which—

Figure 2:
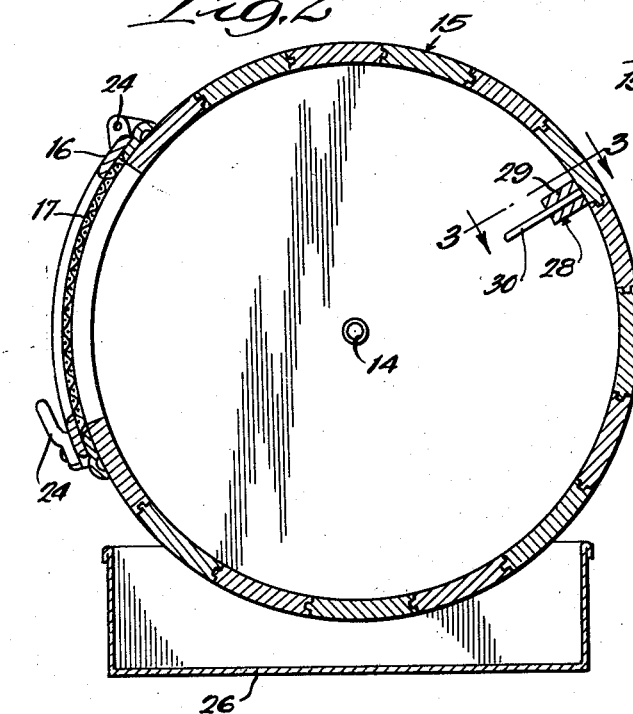
Figure 3:
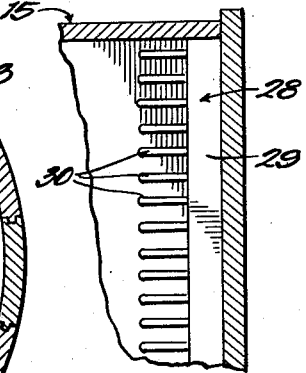

Fig. 1 is a front view in elevation of apparatus embodying our invention; Fig. 2, an enlarged transverse sectional view, the section being taken as indicated at line 2 of Fig. 1; and Fig. 3, a detailed sectional view, the section being taken as indicated at line 3 of Fig. 2.

In the illustration given, 10 designates a vat adapted to receive milk from any source, as, for example, from the tank 11 thereabove. In the vat 10, the curd is formed in the usual way, the curd at the time being in relatively small particles in the whey. The whey and curd are drawn through pipe 12 and pumped by pump 13 through a hollow trunnion 14 into a rotatably-mounted cylinder 15.

The cylinder 15 may be of any suitable structure. In the illustration given, the cylinder is provided with closed ends but the cylinder itself is provided with a door 16 having screens 17 extending thereacross. If desired, the door may be completely covered by screens or may be provided throughout with spaced perforations. Excellent results are also obtained when the entire body of the cylinder is provided with spaced perforations. Opposite the trunnion 14 is a shaft 18 secured to the cylinder 15 and the shaft 18 is journaled within the bearing member 19. The bearing member 19 is provided with speed reduction gears driven by shaft 20. Mounted upon shaft 20 is the pulley 21 which in turn is driven by a belt 22 connected to a pulley on the shaft of motor 23.

In the illustration given, the door 16 is secured to the cylindrical wall 15 by hinges 24 and pivotally-mounted locking members 25 are provided for releasably locking the door 16 in place.

Below the cylindrical vessel 15 is supported a trough 26 equipped with a valved draw-off pipe 27. The pipe 27 may lead to any suitable point of storage for the whey.

Within the cylindrical vessel 15 on one side thereof is mounted a breaker device 28 adapted to break up large balls of cheese and to keep the material within the vessel in relatively small particles. In the specific illustration given, a beam 29 extends longitudinally of the cylindrical member 15 and is secured to the wall by glue, nails or other suitable means. Rods 30 in spaced relation are embedded in the member 29 and extend freely therefrom into position for engaging masses of cheese or curd within the vessel.

The bearings for the trunnions 14 and 18 may be provided by any suitable apparatus. In the illustration given, the standard 31 supports a bearing 32 and the standard 33 supports the bearing member 19. A cross bar 34 connects the standards to form a suitable supporting frame.

OPERATION

In the operation of the process and apparatus, the usual cheese cook and curd forming operations are performed and the resulting curd and whey is drawn from the vat 10 through pump 13 and into the interior of the cylindrical vessel 15. It will be understood that, if desired, the curd may be simply transferred manually from a vat into the vessel 15 when the door 16 has been opened. We prefer, however, to pump the whey and the curd particles directly into the vessel 15.

Vessel 15 is rotated through the reduced gearing in the bearing casing 19. We have found that good results are obtained when the rotation is quite slow. By way of example, good results were obtained when the rotations were between 6 and 14 revolutions per hour. We have discovered that very good results are obtained when the rotation is intermittent. For example, the cylindrical vessel may be rotated for 2 minutes and then allowed to stand without moving for 4 minutes. In treating some types of cheese curd, it is found that the rotation may be continuous if the speed is extremely slow. We find that the speed of rotation will vary with different types of cheese curd being treated and under various other changes in operating conditions.

As the vessel 15 is rotated, the whey is very rapidly removed. For example, we find that more than 90% of the whey is removed in a very brief period and eventually more than 95% of free whey is removed from the curd or cheese body.

In the rotation of the curd and whey body, it is found that the curd builds up on the walls of the cylinder and is carried upwardly to a certain elevated position in which it folds over or breaks, the curd then falling into the lower portion of the vessel. As the curd breaks away from the screen 17, it has a suction effect which effectively cleans the screen and leaves the screen free for its function in the removal of whey.

The breaker apparatus 28 prevents the formation of large balls of curd which would otherwise make the effective removal of whey impossible and which would greatly reduce the uniformity of the final product. The breaker bars or rods 30 constantly strike the larger masses of the curd or cheese and break up such masses. The whey drains from the smaller or broken masses and effective removal of whey is obtained. At the same time, it is found that the whey is obliged to drain through the mat of cheese or curd and in this manner all the fat and other desirable parts of the whey are retained in the cheese, the escaping whey being substantially free of the materials which it is desired to retain in the body of the curd or cheese.

As the process continues, cheese body characteristics begin to develop in the material and a cheese product of excellent quality is produced. In this step of the process, it may be desirable to introduce an atmosphere other than air into the container and this may be effected through the hollow trunnion 14 by any suitable connections, as for example, through the valved pipe 35. Likewise, we can introduce into the container bacterial media of a suitable type to hasten curing.

After the desired cheese body characteristics have been fully developed, the cheese is removed. By reason of the broken-up condition of the cheese, the material can be readily packed in packages suitable for final sale. If desired, the door 16 may be opened and the material within the vessel allowed to drop directly into such final packages supported in the trough 26 below the vessel 15. In this operation, a slight rotation of the cylinder 15 is effective in the mechanical removal of the material.

In the curd forming operation, the curd is kept in comminuted form by the operation of the usual agitator apparatus in curd-forming vats so that after the formation of the curd the material may be readily pumped through pipe 12 and hollow trunnion 14 into vessel 15. By rapidly removing the whey by means of the perforated cylinder and then by continuously breaking up the masses or balls of curd, it is found that cheese body characteristics begin to develop much earlier than in prior processes with the result that the period of the cheese-making operation is reduced and at the same time a better quality is obtained. Further, the product which is obtained may be more readily packed into containers for sale. In all of the operations described it will be noted that the material does not come into contact with the hands of the workman and the entire operation is accomplished mechanically. The curd and whey is pumped into a receptacle or machine which is so operated as to regulate the curd particle size, drainage and acidity development and finally, after the proper cheese body characteristics have been built up, the cheese may be removed mechanically and filled into hoops or packages. The apparatus further permits the treating of the curd in an aerated atmosphere or in an atmosphere of a selected gas so that the cheese is given a superior body and flavor.

Specific examples of the process may be set out as follows:

Example I

Curd was formed in a vat in the usual manner and then pumped through a Viking gear pump to a drainage vessel of the type described in the drawing. As the whey and curd were pumped, it was found that the curd particles became fairly uniformly distributed through the body of whey and when the material flowed into the drainage vessel, the curd particles, with no reduction in size, deposited to form a rather uniform bed in the bottom of the stationary vessel and over the screen. The whey was very rapidly removed, flowing through the bed of curd particles to the extent of about 94% of the whey. A test of the bed indicated that the bed retained the fat and other desirable parts of the whey, while a test of the escaping whey showed that it was substantially free of fat and such materials desired for the cheese.

The drainage vessel was rotated and further drainage of the whey brought about, while the curd and forming it into a cheese body. The removal of the whey quickly from the curd was found to reduce the time required for for cheese-making by at least one-third of the time heretofore required.

Example II

Milk was run into a curd-forming vat and the curd formed in the usual manner. The curd and whey were pumped from the vat by a Waukesha pump (Moyno) and upwardly against a small head of whey and curd particles into a draining vessel. The pumping of the material against the head was found to improve the uniform distribution of the curd particles throughout the whey. The mixture of whey and curd entering the perforated draining vessel produced a deposit of curd particles, unaltered and unreduced in size, upon the vessel and provided a porous mat or filter bed through which the whey drained. The whey escaping from the vessel was found to contain substantially no fat or other material resired for the cheese body. The curd material within the cylindrical perforated vessel was worked to separate the whey therefrom by using a rotating screw. The screw lifted the material and dropped it within the stationary cylindrical vessel and the whey was rapidly removed therefrom. The time for forming the cheese was reduced by approximately 40% as compared with the time heretofore required in cheese-making.

*Example III*

A curd was formed in a vat in the usual manner and the curd and whey was pumped by a Laboor pump (French) to a drainage vessel, the pumping being continuous over a substantial period during which the whey particles of unreduced size built up on the vessel to form a filter bed thereon. The filter bed was found to retain the fat and other desired constituents of the cheese, allowing the whey to escape substantially free of such material. In the subsequent working of the curd for the further removal of whey, such fat, etc. was distributed thoroughly through the body of material and increased the quality of the final product. The cheese body developed more rapidly and the cheese product was finished within a period of time less than two-thirds of the time heretofore required.

In the foregoing operations, it was found that the pumping resulted in a general agitation of the material which caused the curd particles to be distributed through the whey body and the protective influence of the whey was thus increased for each particle. The pumps provided a substantial clearance and the curd particles were received in the drainage vessel substantially intact and unreduced in size. By preventing reduction in particle size, there was less tendency for the fat to spill out of the curd.

Further, the curd particles, thus preserved in proper size and condition, tended to form a filter bed which rapidly released the whey, while screening out and retaining the fat, etc. The pumping operation was found effective in preventing settling of the curd particles prior to their reaching the drainage vessel and to prevent knitting of the curd particles. When the curd and whey were allowed to drain from the curd-forming vessel to a drainage tank at another level, there was a tendency for the curd particles to settle out and to knit into curd bodies, and when such curd bodies reached the drainage vessel they formed a bed unsatisfactory for the release of whey. By the pumping operation described, the curd was preserved in intimate mixture with the whey and in the proper particle size and without reduction in particle size. Thus knitting of the particles was prevented and a highly effective filter bed, as above described, provided in the drainage vessel.

While in the foregoing description specific details have been set out for the purpose of illustrating embodiments of the invention, it will be understood that such details may be varied widely by those skilled in the art without departing from the spirit of our invention.

We claim:

In a process for the preparation of cheese wherein a body comprising curd particles in whey is obtained, the steps of pumping curd particles in whey from said body to a whey-separating zone, discharging the pumped curd particles in whey into said separating zone onto a support adapted to retain the curd particles while permitting whey to pass therethrough, and progressively building up a bed of curd particles on said support while draining whey through said bed, whereby a body of drained curd particles is obtained for forming into cheese.

References Cited in the file of this patent

UNITED STATES PATENTS

| | | |
|---|---|---|
| 1,475,398 | Kielsmeier | Nov. 27, 1923 |
| 1,650,625 | Hapgood | Nov. 29, 1927 |
| 2,165,005 | Petersen | July 4, 1939 |
| 2,544,672 | Greer et al. | Mar. 13, 1951 |
| 2,574,508 | Strezynski | Nov. 13, 1952 |